United States Patent
Ahn et al.

(10) Patent No.: US 8,057,854 B2
(45) Date of Patent: Nov. 15, 2011

(54) SURFACE TREATMENT METHOD FOR COATED CUTTING INSERT

(75) Inventors: Dong Gil Ahn, Daegu (KR); Chul Woen Yun, Daegu (KR); Seung Hwan Lee, Daegu (KR)

(73) Assignee: Taegutec, Ltd. (KR)

( * ) Notice: Subject to any disclaimer, the term of this patent is extended or adjusted under 35 U.S.C. 154(b) by 293 days.

(21) Appl. No.: 12/516,488

(22) PCT Filed: Nov. 30, 2006

(86) PCT No.: PCT/KR2006/005132
§ 371 (c)(1),
(2), (4) Date: May 27, 2009

(87) PCT Pub. No.: WO2008/066213
PCT Pub. Date: Jun. 5, 2008

(65) Prior Publication Data
US 2010/0048103 A1    Feb. 25, 2010

(51) Int. Cl.
*C23C 16/00* (2006.01)
*B24B 1/00* (2006.01)
*C23C 16/24* (2006.01)
*B23P 15/28* (2006.01)
(52) U.S. Cl. .................. 427/248.1; 451/44; 407/119
(58) Field of Classification Search .................. 407/119; 451/44; 76/108.1–108.6; 427/248.1
See application file for complete search history.

(56) References Cited

U.S. PATENT DOCUMENTS

| | | | |
|---|---|---|---|
| 5,251,468 A | 10/1993 | Lin et al. | |
| 5,543,210 A | 8/1996 | Kullander et al. | |
| 5,776,588 A * | 7/1998 | Moriguchi et al. | 428/210 |
| 5,944,587 A | 8/1999 | Stadtfeld | |
| 6,287,682 B1 * | 9/2001 | Grab et al. | 428/336 |
| 6,802,677 B2 * | 10/2004 | Shaffer | 407/113 |
| 2001/0051076 A1 | 12/2001 | Kunimori et al. | |
| 2002/0187370 A1 | 12/2002 | Yamagata et al. | |
| 2004/0257690 A1 | 12/2004 | Nishida et al. | |

(Continued)

FOREIGN PATENT DOCUMENTS

EP    1 095 735 A1    5/2001

(Continued)

OTHER PUBLICATIONS

International Search Report in PCT/KR2006/005132, dated Aug. 24, 2007.

(Continued)

*Primary Examiner* — Matthew Daniels
*Assistant Examiner* — Lisa Herring
(74) *Attorney, Agent, or Firm* — Womble Carlyle

(57) ABSTRACT

A surface treatment method can perform coated surface treatment on a cutting edge R and a rake surface, while maintaining a radius of curvature of the cutting edge R and uniformly surface-treating the rake surface. The surface treatment method includes providing an opening chamfered at corners adjacent to an upper surface of the fixture to the fixture for fixing a coated cutting insert; fixing the coated cutting insert inside the opening in such a manner that a rake surface of the coated cutting insert is disposed lower than upper surfaces of the fixture but higher than a lower edge created on the opening of the fixture by the chamfering; and conducting the surface treatment on a cutting edge R and the rake surface of the coated cutting insert.

16 Claims, 1 Drawing Sheet

U.S. PATENT DOCUMENTS

2006/0019120 A1    1/2006    Jonsson
2007/0104871 A1*   5/2007    Stout et al. .................... 427/282

FOREIGN PATENT DOCUMENTS

| JP | 60-24371 | 2/1994 |
|---|---|---|
| RU | 2 137 590 | 9/1999 |
| SU | 1292995 | 8/1987 |
| SU | 1495005 | 7/1989 |
| WO | WO 01/03539 A1 | 5/2001 |

OTHER PUBLICATIONS

Response to Written Opinion in PCT/KP2006/005132, dated Nov. 25, 2008.

Decision on Grant issued in co-pending Russian Patent Application No. 2009124908, filed Nov. 30, 2006.

Extended European Search Report dated May 25, 2011 issued in corresponding EP application No. 06823840.1 (EP 2 097 216).

* cited by examiner

SURFACE TREATMENT METHOD FOR COATED CUTTING INSERT

TECHNICAL FIELD

The present invention relates to a surface treatment method for a cutting insert, and more particularly to a surface treatment method for a coated cutting insert, which is coated with ceramic layers of wide range hardness on a surface of the cutting insert so as to improve insert life and cutting performance.

BACKGROUND ART

Surface treatment is conducted on a coated cutting insert in order to remove coated surface defects and improve surface roughness, thereby reducing cutting resistance and preventing the fusion of the coated surface with a work piece. Conventionally, cutting inserts coated with CVD or PVD have been surface-treated by methods of blasting, polishing, brushing and the like. For such surface treatments, the coated cutting insert is fixed within a fixture, as shown in FIG. 1.

The conventional fixture (2) seizes only a lower part of a cutting insert (4), while an upper part of the cutting insert (4) partially protrudes from an upper surface of the fixture (2). By doing so, the insert (4) is surface-treated by brushing and the like. For example, a rotating brush can be used for surface treatment. During surface treatment by a rotating brush, the cutting edge R (6) is subject to a larger load compared to that of a rake surface (8) (the load mainly includes a pressure force of the brush and partially includes an impact or frictional force from the brush). This is because the rotating brush, which has a relatively large impact with rotating, hits the protruding cutting edge R (6) first and brushes the cutting edge R (6) with a relatively large load, wherein the brush then proceeds to brush the rake surface (8) with a relatively reduced impact and load. For this reason, the brushing load of the rotating brush is concentrated on the cutting edge R (6) rather than on the rake surface (8). Accordingly, the honed amount (H) (indicating an amount of wearing at the cutting edge R, which is usually measured as a straight distance from a starting point to an end point of the cutting edge R, along the surface perpendicular to a lower surface of the insert) or the radius of curvature of the cutting edge R increases after the surface treatment (rather than before such a treatment), even if the surface treatment period, brushing pressure, rotation speed and the like are controlled. In particular, the portion adjacent to the rake surface (8) of the cutting edge (R) is more severely worn out during the surface treatment compared to the portion adjacent to the flank surface (10). As a result, the curvature radius adjacent to the rake surface (8) of the cutting edge (R) becomes asymmetrically larger than that of the portion adjacent to the flank surface (10).

As the curvature radius of the cutting edge R becomes larger during the surface treatment, there is a problem in that the cutting performance of the cutting insert is degraded and precise machining cannot be performed. This deteriorates the surface roughness of a work piece. In particular, if the curvature radius of the cutting edge R, which should be kept as small as possible, becomes larger in a PVD-coated cutting insert, then the cutting performance of the PVD-coated cutting insert is remarkably degraded.

Further, in the conventional fixture structure, since the insert (4) is disposed protruding from the fixture (2), the load for surface treatment is concentrated on the insert (4) rather than the fixture (2). If the load (e.g., from a rotating brush) is concentrated on the rake surface of the insert, which has chip breakers (not shown) of a highly curved shape, then the protruded portion on the rake surface is subject to a larger load than the recessed portion on the rake surface. Accordingly, the protruding portion is severely worn out relative to the recessed portion and the coated surface of the rake surface is non-uniformly treated. As such, in the conventional fixture structure wherein the insert is fixed protruding from the fixture, it is difficult to achieve a surface treatment that is uniformly conducted on the rake surface having chip breakers of a curved shape. A coated rake surface having chip breakers contacts and bends cutting chips generated during the cutting process, thereby controlling the discharge of cutting chips. The non-uniformly treated and coated rake surface obstructs the smooth discharge of cutting chips, thereby resulting in the degradation of cutting performance.

As such, according to the conventional surface treatment method, the curvature radius of the cutting edge R becomes larger and the rake surface is not uniformly treated. Thus, the cutting performance of the coated cutting insert is degraded and the life of the coated cutting insert is reduced.

An object of the present invention is to provide a new surface treatment method, which can perform coated surface treatment on a cutting edge R and a rake surface, while maintaining a radius of curvature of the cutting edge R and uniformly surface-treating the rake surface.

SUMMARY OF THE INVENTION

In order to achieve the object of the present invention, the surface treatment method of the present invention comprises the following steps:

providing a fixture including two or more fixing walls for the coated cutting insert, the upper corners of which are chamfered;

disposing the coated cutting insert inside an opening between the fixing walls;

fixing the coated cutting insert inside the opening in such a manner that a rake surface of the coated cutting insert is disposed lower than upper surfaces of the fixing walls; and conducting surface treatment on a cutting edge R and the rake surface of the coated cutting insert.

According to the surface treatment method of the present invention, it is possible to conduct surface treatment while maintaining the curvature radius of a cutting edge R. It is also possible to conduct uniform surface treatment of a rake surface having a highly curved shape. It is also possible to impart different colors to the rake surface and the flank surface by maintaining an original coating status of a flank portion. In addition, the coated cutting insert, which is surface-treated by the method of the present invention, maintains the original curvature radius in order to perform a precise cutting process. Further, the rake surface is uniformly treated such that chips can be effectively discharged. Accordingly, the life of the cutting insert can be enhanced.

Figure 1:
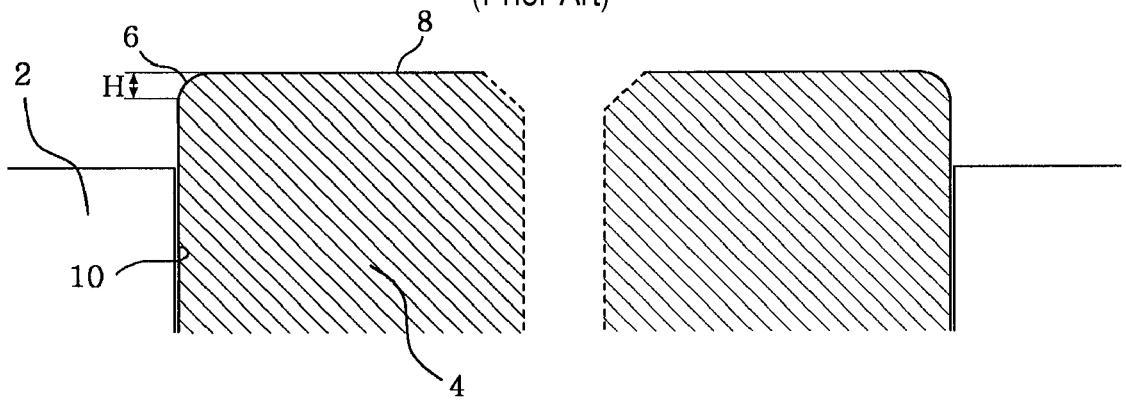
FIG. 1 is a cross-sectional view illustrating a coated cutting insert fixed in a fixture according to the conventional surface treatment method.

DESCRIPTION OF LEGEND IN THE DRAWINGS 2, 12: fixture
4, 14: coated cutting insert
6, 16: cutting edge R
8, 18: rake surface
10, 20: flank surface
22: upper surface of the fixing wall
24: lower edge
26, 28: insert fixing wall

DETAILED DESCRIPTION

The preferred embodiments of the present invention will now be described in detail with reference to the accompanying drawings.

Figure 2:
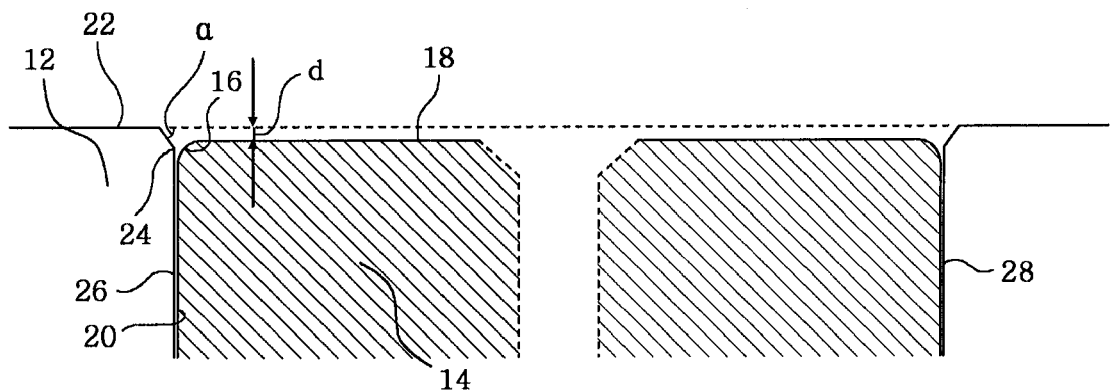
FIG. 2 is a cross-sectional view illustrating a coated cutting insert fixed in a fixture according to the surface treatment method of the present invention.

In the present invention, a fixture (12) for fixing a PVD- or CVD-coated cutting insert has an opening for receiving the cutting insert (14), as shown in FIG. 2. The opening is defined by two or more fixing walls (26, 28) of the coated cutting insert (14). The upper corners of the fixing walls (26, 28) are chamfered. Preferably, the chamfering angle ($\alpha$) is 45±20 degrees.

The coated insert (14) is fixed in the opening of the fixture (12) in such a manner that a rake surface (18) of the coated insert (14) is disposed lower than upper surfaces (22) of the fixing walls (26, 28). Preferably, a gap (d) between the rake surface (18) of the coated insert (14) and the upper surface (22) of the fixing walls (26, 28) is 0.1~0.6 mm. When the surface treatment is performed within the range of the chamfering angle ($\alpha$) (45±20 degrees) and the gap (0.1~0.6 mm), an optimal load can be applied to the cutting edge R (16). If the chamfering angle ($\alpha$) and the gap (d) deviate from the above range, then a sufficient load cannot be applied or may even result in an excessive load. Preferably, the rake surface (18) of the coated insert (14) is disposed higher than a lower edge (24) of the chamfered portion so as to facilitate the treatment of the cutting edge R (16).

The surface treatment is preferably performed by a brushing method. However, it is expressly stated herein that various other known surface treatment methods (e.g., blasting, polishing, etc.) can be used. Water or diamond particles can be used as an abrasive material.

The material of the fixture (12) may be plastic. Although the fixture (12) can be made of metal such as carbon steel or other materials, a plastic fixture with a lower hardness is preferred for preserving the coating layer of the insert surface when the insert is received. The plastic material used for the fixture is preferably heat-resistant reinforced plastic so as to bear frictional heat produced during the surface treatment process, e.g., brushing.

According to the embodiment of the present invention, an excessive load is prevented from being applied to the cutting edge R (16) during the surface treatment process, for example, by a rotating brush. The brush hits the upper surface (22) of the fixing walls (26, 28) and its brushing load is reduced before the brush reaches the cutting edge R (16) of the coated insert. Then, the brush contacts the cutting edge R (16). As such, applying an excessive load to the cutting edge R (16) can be avoided. In this manner, the present invention solves the problem where an excessive brushing load is applied on the cutting edge R, thereby increasing the honed amount or the radius of the curvature of the cutting edge R after the surface treatment. Further, the honed amount or the curvature radius of the cutting edge R of the cutting insert before the surface treatment can be maintained even after said surface treatment. In particular, it is possible to conduct the surface treatment while maintaining a curvature radius the cutting edge R of the PVD-coated cutting insert featured by having a small curvature radius of the cutting edge R. The surface treatment method of the present invention is also effective for the surface treatment of a CVD-coated cutting insert.

Table 1 shows a comparison of the honed amounts of cutting edge R in PVD- or CVD-coated cutting inserts (named based on ISO standards) after the surface treatment by a conventional surface treatment method and the surface treatment method of the present invention are applied. As shown in Table 1, the honed amount of the cutting edge R increases after being subjected to the conventional surface treatment method, whereas the honed amount of the cutting edge R rarely changes after the surface treatment method of the present invention.

TABLE 1

| Coating layer and coating method | Insert description | Honed amount of cutting edge R (μm) in the conventional treatment | | Honed amount of cutting edge R (μm) in the present invention | |
|---|---|---|---|---|---|
| | | Before treatment | After treatment | Before treatment | After treatment |
| AlTiN mono layer/PVD | APKT1705 | 23 | 29 | 23 | 24 |
| | SPKN1204 | 25 | 33 | 25 | 25 |
| Complex coating layer with TiN outmost layer/CVD | CNMG1204 | 38 | 45 | 38 | 38 |
| | CCMT09T | 36 | 44 | 36 | 37 |

In the conventional fixture structures shown in FIG. 1, since the load is excessively concentrated on the insert (4) protruding from the fixture (2), an excessive pressure is applied to the insert (4). In particular, stress concentration occurs at protruded portions (not shown) on the rake surface (8) of the insert (4). Accordingly, it was difficult to uniformly surface-treat the protruded portions and recessed portions of the rake surface (8). Such concentration of load in the conventional fixture structures is most severe at the vicinity of the cutting edge R (6). Accordingly, the protruded portions adjacent to the cutting edge R (6) are subject to a larger load and become severely worn out. However, in the present invention, the insert (14) is disposed lower than the upper surface (22) of the fixing walls (26, 28). Thus, unlike the conventional fixture structures, the brush hits the upper surface (22) of the fixing walls (26, 28) and then contacts the rake surface (18) of the insert (14) with a weaker force. Further, the difference between loads actually applied on the protruded portion (not shown) and those applied on the recessed portion (not shown) can be also reduced. Accordingly, in case the rake surface (18) has a differently curved surface shape of chip breakers, excessive loading and brushing abrasion can be prevented from occurring on the protruded portion rather than the recessed portion. As such, the rake surface (18) can be uniformly surface-treated.

Figure 3:
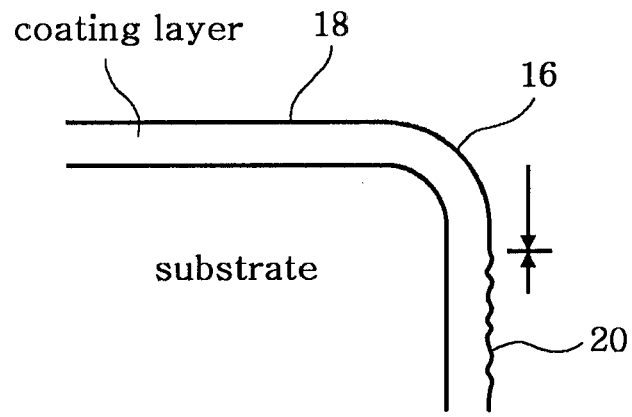
FIG. 3 is a cross-sectional view illustrating a coated cutting insert, which is surface-treated according to the embodiment shown in FIG. 2.

FIG. 3 is a cross-sectional view showing a coated cutting insert, which is surface-treated according to the present invention. As shown in FIG. 3, the coated cutting insert maintains a favorable radius of curvature and the rake surface (18) is surface-treated uniformly. The coated cutting insert favorably maintains the radius of curvature of cutting edge R in order to perform a precise cutting process. Further, the rake surface is uniformly treated such that the chips can be effectively discharged. Accordingly, the life of the cutting insert is enhanced. Also, as shown in FIG. 2, a flank surface (20) in the present embodiment is disposed through masking by the fixing walls (26, 28). Thus, as shown in FIG. 3, the flank surface (20) is not surface-treated during the surface treatment process and it can maintain its original coating thickness. As such, the reduction of abrasion resistance on the flank surface can be prevented. Further, it is also possible to impart different colors to the rake surface and the flank surface as well as to obtain a rake surface with excellent roughness.

Although the present invention has been described through the exemplary embodiments, it is obvious that various alternations or modifications can be made without departing from the scope of the present invention. Further, such alternations are also included in the scope of the present invention. For example, the surface treatment method of the present invention can be applied to cutting inserts of various shapes such as triangle, rectangle, etc. The size or shape of fixing walls of the fixture for fixing the cutting inserts is not limited.

The invention claimed is:

1. A method of surface treating a coated cutting insert, comprising:
    providing a fixture including two or more fixing walls for the coated cutting insert having chamfered upper corners;
    disposing the coated cutting insert inside an opening between the fixing walls;
    fixing the coated cutting insert inside the opening such that a rake surface of the coated cutting insert is disposed lower than upper surfaces of the fixing walls; and
    conducting a surface treatment on a cutting edge R and the rake surface of the coated cutting insert.

2. The method of claim 1, wherein the rake surface of the coated cutting insert is disposed higher than lower edges of the chamfered portions of the fixing walls.

3. The method of claim 1, wherein a chamfering angle of the fixing walls ranges from 25 to 65 degrees, and wherein a gap between the rake surface of the coated cutting insert and the upper surfaces of the fixing walls ranges from 0.1 to 0.6 mm.

4. The method of claim 1, wherein the surface treatment is conducted by brushing.

5. The method of claim 4, wherein the coated cutting insert is a PVD-coated cutting insert.

6. The method of claim 1, wherein a flank surface of the coated cutting insert is not surface-treated.

7. The method of claim 1, wherein the fixture is made from heat-resisting reinforced plastic.

8. A method of surface treating a coated cutting insert comprising:
    providing a fixture configured to retain at least one coated cutting insert, the fixture comprising at least first and second spaced apart fixing walls defining an opening, the first and second fixing walls having associated respective first and second upper surfaces which are spaced apart from one another and define a first plane, each fixing wall and its associated upper surface forming a chamfered corner;
    positioning at least one coated cutting insert in the opening between the first and second spaced apart fixing walls such that at least one cutting edge and an associated rake surface of the coated cutting insert are entirely on one side of the first plane with a gap being formed between the at least one cutting edge and the first plane; and
    performing a surface treatment operation on the at least one cutting edge.

9. The method according to claim 8, comprising:
positioning the at least one coated cutting insert such that the at least one cutting edge is located closer to the first plane than a lower edge of either chamfered corner.

10. The method according to claim 8, comprising:
positioning the at least one coated cutting insert such that the entire rake surface is located closer to the first plane than to a lower edge of either chamfered corner.

11. The method according to claim 8, wherein:
a chamfering angle established between the first plane and the chamfered corner is between 25 degrees and 65 degrees; and
the gap between the at least one cutting edge and the first plane is between 0.1 mm and 0.6 mm.

12. The method according to claim 8, comprising:
brushing the at least one cutting edge, as the surface treatment operation.

13. The method according to claim 12, further comprising:
coating an uncoated cutting insert by physical vapor deposition to form the coated cutting insert, prior to said step of performing a surface treatment.

14. The method according to claim 8, comprising:
hitting one of said first and second upper surfaces of the fixture with a brush, before the brush reaches said at least one cutting edge of the cutting insert.

15. The method according to claim 8, wherein:
said step of performing a surface treatment operation on the at least one cutting edge also causes surface treatment of the associated rake surface, but not of a flank surface of the at least one cutting insert.

16. The method according to claim 8, wherein:
the fixture comprises heat-resisting reinforced plastic.

* * * * *